United States Patent
Shu et al.

(10) Patent No.: US 7,336,726 B2
(45) Date of Patent: Feb. 26, 2008

(54) APPARATUS AND METHOD FOR POWER CONTROL IN DIGITAL MOBILE COMMUNICATION SYSTEM BROADBAND MULTI-CARRIER BASE STATION

(75) Inventors: Yuxin Shu, Shenzhen (CN); Qingquan Peng, Shenzhen (CN); Wenlong Zheng, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 763 days.

(21) Appl. No.: 10/469,192

(22) PCT Filed: Oct. 26, 2001

(86) PCT No.: PCT/CN01/01508

§ 371 (c)(1),
(2), (4) Date: Aug. 25, 2003

(87) PCT Pub. No.: WO02/091770

PCT Pub. Date: Nov. 14, 2002

(65) Prior Publication Data

US 2004/0071226 A1    Apr. 15, 2004

(30) Foreign Application Priority Data

Feb. 27, 2001   (CN)   ................. 01 1 05447
May 25, 2001   (CN)   ................. 01 1 12989

(51) Int. Cl.
*H04L 27/00*        (2006.01)
(52) U.S. Cl. .................................... 375/299
(58) Field of Classification Search ........... 375/295, 375/297, 299; 455/13.4, 127.1, 522, 571; 370/318, 480, 204, 208, 337, 347; 327/260; 379/395.01; 398/94
See application file for complete search history.

(56) References Cited

U.S. PATENT DOCUMENTS

| | | | | |
|---|---|---|---|---|
| 6,570,929 | B1 * | 5/2003 | Eriksson | ................. 375/260 |
| 6,694,148 | B1 * | 2/2004 | Frodigh et al. | ............. 455/522 |
| 7,062,289 | B2 * | 6/2006 | Shu et al. | ................... 455/522 |

FOREIGN PATENT DOCUMENTS

| | | |
|---|---|---|
| EP | 0955736 | 11/1999 |
| EP | 0982906 | 3/2000 |
| EP | 0987832 | 3/2000 |
| WO | WO 00/04649 | 1/2000 |

OTHER PUBLICATIONS

International Search Report for PCT/CN01/01508 mailed Dec. 13, 2001.

* cited by examiner

*Primary Examiner*—Sam K. Ahn

(57) ABSTRACT

Disclosed is an open-loop power control method for base station in a broadband GSM system. The method employs an open-loop control method and implements the power control for each carrier after synthesizing multi-way digital intermediate frequencies. In this method, the dynamic power level control and the slope power control are implemented individually by utilizing an inherent characteristic that the up-down slope control (including the static power control) of the respective carrier frequencies is performed synchronously. The open-loop power control method for multi-carrier according to the invention allows the power control for the respective carriers to be independent of each other completely, and the transmitting power of any carrier at any time slot can be varied flexibly and easily.

11 Claims, 2 Drawing Sheets

APPARATUS AND METHOD FOR POWER CONTROL IN DIGITAL MOBILE COMMUNICATION SYSTEM BROADBAND MULTI-CARRIER BASE STATION

FIELD OF THE TECHNOLOGY

The present invention relates to a multi-carrier power control apparatus for base station in a broadband digital mobile communication system and control method thereof, and it can be applied to all Time Division Multiple Address (TDMA) systems in which power control is required.

BACKGROUND OF THE INVENTION

Among all digital cellular mobile communication systems, the GSM communication system is the most developed and has the largest market occupation. It employs the digital wireless communication technology in which FDMA and TDMA are combined.

One of the effective measures for improving the system capacity of GSM communication system is to increase the utilization factor of the spectrum, specifically, is to decrease interference between channels. At present, there are three kinds of main methods for decreasing the interference: automatic power control, frequency hopping and discontinuous transmitting (DTX). Here, DTX is essentially a kind of power control method. Therefore, the power control in GSM is an important means for decreasing the multiple access interference. It not only can significantly improve the channel quality, but also can increase the system capacity to a large extent.

The principle of the automatic power control is that the transmitting power of a transmitter will be adaptively decreased under a condition that the excellent transmission quality can be obtained without the maximum transmitting power, namely, the even transmitting power of mobile stations and base stations will be reduced if it can be ensured that transmitting quality is greater than a given threshold, thereby the interference to other channels can be decreased. The power control occupies an important position in transmitting technology, specifically, the performance quality of a transmitter mainly depends on the performance of the power control. In practice, multiple terms in the wireless specification of GSM aim at the power control.

As shown in FIG. 1, a traditional narrow band GSM base station normally employs a close-loop power control method that performs single power control for each carrier. The control procedure is as follows. A positive direction power detection voltage outputted from a power amplifier is detected by a detector 105, then a subtraction is implemented in an adder 104 for the above-mentioned voltage and a template curve 106 obtained in advance according to a certain algorithm, the resultant difference is used to control an attenuator 101 in transmitting passage through an integrator 103, thereby the transmitting power is modified. If the power voltage detected at a certain time is lower than a known template voltage 106, the voltage outputted by the integrator 103 will be increased, the attenuation of the attenuator 101 will be decreased, and the output power will be increased to facilitate the increasing of the positive direction power detection voltage. In contrast, if the detected voltage is higher than the template voltage 106, the voltage outputted by the integrator 103 will be decreased, the attenuation of the attenuator 101 will be increased, and the final output power of the power amplifier will be decreased, thereby the voltage outputted by the detector will be decreased.

The power control of a broadband multi-carrier GSM system is a new subject occurring in an evolvement procedure of GSM base station from narrow band to broadband, and it is also a problem that must be solved in developing the broadband multi-carrier GSM technology. Since there is a large difference between the structure of a broadband base station and that of a traditional base station, it is difficult to apply the traditional single-carrier power control method to a broadband base station. So far, the information on the multi-carrier power control of GSM has not been found.

A multi-carrier signal is a combination of the respective single-carrier signals. Because the frequency points and powers of the respective carriers are variable and the envelope of a multi-carrier combination signal is difficult to be predicted, it is difficult to detect the power envelopes of the respective carrier frequencies with a simple and easy method. While the power envelope of each carrier can be detected in real time is a premise condition to implement the close-loop power control, therefore, a great difficult exists in implementing the close-loop power control for multi-carrier signals.

SUMMARY OF THE INVENTION

In order to overcome the disadvantages of the traditional power control method for the base station, an object of the present invention is to provide a multi-carrier power control apparatus for the base station in a broadband digital mobile communication system and control method thereof. By using an inherent characteristic that the transmitting channel of the multi-carrier transmitter has superlinearity, this method and apparatus are capable of simultaneously performing the power control for a plurality of carriers and satisfying the requirements of the time domain template and the frequency domain template at the same time. Furthermore, the power control for the respective carriers is independent of each other, therefore, the transmitting power of any carrier at any time slot can be varied flexibly and easily.

To achieve the object of the present invention, the following technical schemes are utilized in the invention.

A multi-carrier power control apparatus for base station in a broadband digital mobile communication system, comprising: N digital up-conversion processors, a data processor, an adder, a digital to analog converter, a filter and a transmitter with a numerical controlled attenuator; wherein N-way baseband signals are respectively inputted to the N digital up-conversion processors, meanwhile, the power control data and the carrier frequency information are sent to the data processor and processed by the data processor, and then the dynamic power level data are respectively outputted from the data processor to N digital up-conversion processors, and the data outputted from N digital up-conversion processors are transferred to the adder, the synthesized data are sent in turn to the digital to analog converter, the filter and the transmitter with a numerical controlled attenuator, meanwhile, the up-down slope control data are also outputted from the data processor to the transmitter with a numerical controlled attenuator to be transmitted by the transmitter.

A multi-carrier power control apparatus for base station in a broadband digital mobile communication system, comprising: N digital up-conversion processors, wherein N is an integer, a summing module, a data processor, a digital to analog converter, a filter and a transmitter with a voltage controlled attenuator; wherein the data processor is a power control module; N-way baseband signals are respectively inputted to the corresponding N digital up-conversion processors, and then outputted from the N digital up-conversion processors to the summing module, synthesized signals outputted from the summing module are sent to the power control module to be processed; meanwhile, power control data and carrier frequency information are sent to the power control module to be processed; after being processed by the power control module, signals from the power control module are outputted through three ways, the signals of one way are respectively sent to the N digital up-conversion processors, the signals of another way are sent to the digital to analog converter, and from the digital to analog converter to the filter, and from the filter to the transmitter with the voltage controlled attenuator, and up-down slope control data are sent through the other way to the transmitter with a voltage controlled attenuator to be transmitted by the transmitter.

Preferably, the power control module comprises an address generator, a power control data memory, an adder, a multiplier and a sign converter. In this apparatus, address codes generated by the address generator are outputted to the power control data memory, and then outputted from the power control data memory to the multiplier; meanwhile, signals outputted from the adder are also outputted to the multiplier; after being accumulated by the multiplier, signals generated from the multiplier are outputted to the digital to analog converter through the sign converter.

receiving, by a data processor, power control data and information of respective carrier frequencies, and generating dynamic power control data, up-down slope control data and corresponding static power control data corresponding to the respective carrier frequencies;

sending, by the data processor, the generated dynamic power control data and the static power control data corresponding to the respective carrier frequencies to corresponding digital up-conversion processors and a voltage controlled attenuator, and implementing, by the digital up-conversion processors, a dynamic power level control;

generating, by a summing module, a multi-way synthesized multi-carrier signal through summing up the signals outputted from the digital frequency converters in the summing module, and sending the multi-carrier signal to an adder;

sending, by the adder, the dynamic power level controlled multi-carrier signal to the voltage controlled attenuator after digital to analog converting in a digital to analog converter and filtering in a filter; and implementing, by the voltage controlled attenuator, the power slope control and a static power control for the received multi-carrier signal in a radio frequency domain based on the up-down slope control data and the static power control data.

In the above-mentioned method, the up-down slope control data can be obtained in an analog domain.

In the above-mentioned method, the method for generating the up-down slope control data includes: determining firstly a power control slope curve, and then storing the curve data of said power control slope curve into the data processor to be called when required.

In the above-mentioned method, the dynamic power level control is a simple transition control performed in a digital domain.

In the above-mentioned method, the static power level control is implemented together with the dynamic power level control, or implemented together with the up-down slope control, or singly implemented by the voltage controlled attenuator.

In the above-mentioned method, that static power level control is implemented together with the dynamic power level control is: the static power level data and the dynamic power control data are directly transferred together from the data processor to the respective digital up-converters to implement the power level control, and the static power control is implemented by the voltage controlled attenuator base on the up-down slope control.

In the above-mentioned method, that static power level control is implemented together with the up-down slope control is realized through transferring both the static power level data and the up-down slope control data from the data processor to the voltage controlled attenuator.

In the above-mentioned method, that static power level control is singly implemented by the voltage controlled attenuator is realized through transferring the static power level data form the data processor to the voltage controlled attenuator.

In the above-mentioned method, different power levels have the same slope control curves and the same slope dynamic range.

BRIEF DESCRIPTION OF THE DRAWINGS

The invention will be described in more detail hereinafter, with reference to the accompanying drawings and embodiments.

DETAILED DESCRIPTION OF THE INVENTION

A multi-carrier power control apparatus for base station in a broadband digital mobile communication system according to the invention and control method thereof employ multi-carrier open-loop power control. The power control for the respective carriers is implemented before or after synthesizing the multi-way digital intermediate frequency signals.

The method for implementing multi-carrier power control after synthesizing the multi-way intermediate frequency signals is realized through separately implementing the dynamic power level control and up-down slope control by utilizing an inherent characteristic that the up-down slopes (including the static power control) of the respective carrier frequencies are synchronized, which will be described in detail through the first embodiment and the second embodiment.

Figure 2:
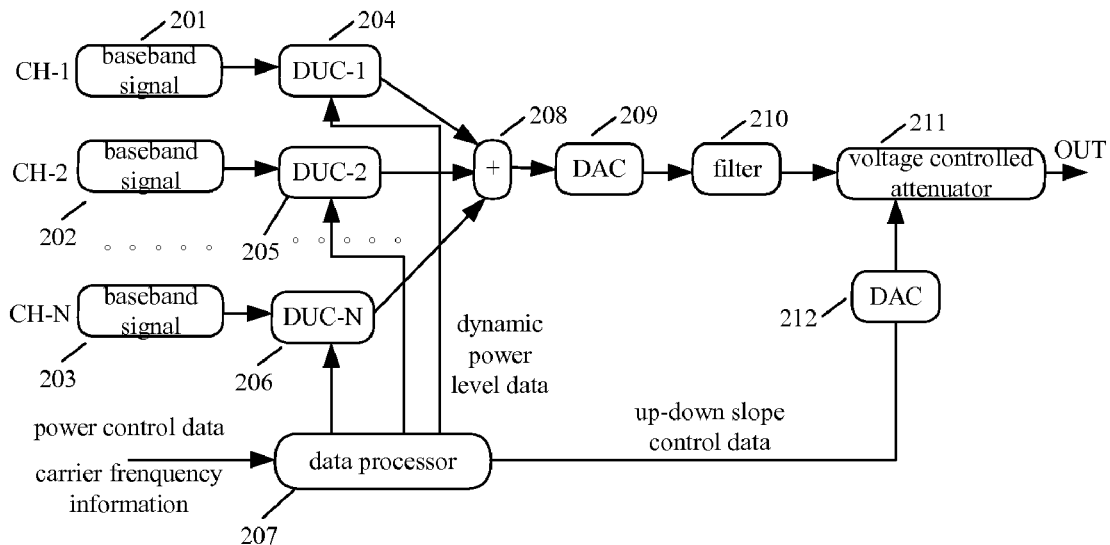
FIG. 2 is a structure schematic diagram showing the first embodiment of the multi-carrier power control apparatus according to the present invention.

Referring to FIG. 2 in which the first embodiment according to the invention is shown, a multi-carrier power control apparatus for base station in a broadband digital mobile communication system comprises: N digital up-conversion processors 204, 205, 206, a data processor 207, an adder 208, a digital to analog converter 209, a filter 210 and a transmitter 211 with a voltage controlled attenuator. N-way baseband signals 201, 202, 203 are respectively inputted to the N digital up-conversion processors. Meanwhile, after the power control data and the carrier frequency information are sent to the data processor 207, two ways of signals are outputted, the up-down slope control data are sent to the transmitter 211 with a voltage controlled attenuator through another analog to digital converter 212 via one way, the dynamic power level data are inputted to N digital up-conversion processors via the other way. The signals from the N digital up-conversion processors are outputted to the adder 208 to be synthesized. The synthesized data are transferred in turn to the digital to analog converter 209, the filter 210, and the transmitter 211 with a voltage controlled attenuator to be transmitted by the transmitter 211.

The digital up-conversion processors DUC 204~206 can implement not only the modulating, filtering and digital up-converting for baseband signals, but also the power control function. The data processor 207 is used to receive the dynamic and static power control level data of the respective carrier frequencies, and then respectively transfer the up-down slope control data and the dynamic power level data to DAC 212 and the corresponding DUC 204, 205, 206.

The dynamic power level control and the up-down slope control are separately implemented by utilizing an inherent characteristic that the up-down slopes of the respective carrier frequencies are synchronized, and mainly through simple transition between the power levels in DUC 204, 205, 206 of the respective carrier frequencies. By controlling the voltage controlled attenuator following DAC 212, the up-down slope control can be implemented in the analog domain. Total N (N is the number of the static power levels supported by the base station) up-down slope control data curves will be required if the static power level control and the up-down slope control are implemented together, and only one up-down slope curve will be required if the static power control is implemented in the digital domain by another voltage controlled attenuator or together with the dynamic power level control. Under the working state, the carrier frequencies and the power level information are received by the data processor 207, the processed information required for power control will be transferred to the corresponding modules, meanwhile the voltage controlled attenuator is controlled by a "V" shaped curve generated by DAC 212. The voltage controlled attenuator 211 and DAC 212 must have sufficient dynamic range for up-down slope power control.

An abrupt change will exist in the power level transition of power control in DUC. Since the control curves of the voltage controlled attenuator are the same for different power levels, an abrupt change still exists at the power level switching point in the power controlled curves. However, because an enough dynamic range can be ensured through the up-down slope control, the abrupt change affects little on the final control effect, which has been verified through simulation and experiment results. The object can be achieved by switching off the DUC output of the carrier frequency for the discontinuous transmission (DTX).

Figure 3:
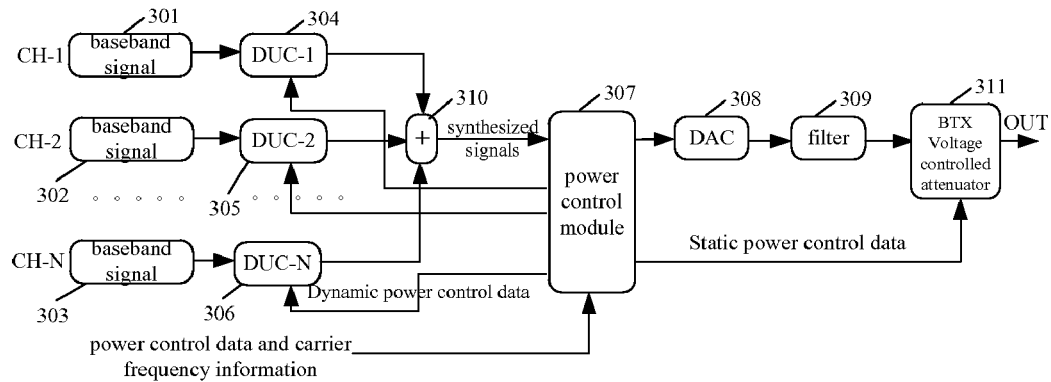
FIG. 3 is a structure schematic diagram showing the second embodiment of the multi-carrier power control apparatus according to the present invention.

For a specific GSM cell, the static power levels set for the respective carrier frequencies are the same and usually will not be changed, so that the static power control can be separated to be implemented individually in the radio frequency portion. FIG. 3 shows another scheme for implementing power control for broadband GSM multi-carrier base station. In this scheme, the static power control is directly implemented under the control of the voltage controlled attenuator in the radio frequency domain based on the setting of static power levels in the cell. The dynamic power level control is implemented according to respective carrier frequencies in DUC 304, 305, 306 of the respective carrier frequencies (only simple transition between the power levels is implemented). The signals outputted from DUC 304, 305, 306 are the signals that have been power level controlled, the respective ways of the signals are transferred to the summing module 310 to be summed. In the power control module 307 following DUC of the respective carrier frequencies, one power control curve is used to implement power slope control for the up-down slope power control, that is, the up-down slope power control is implemented in the digital domain.

The up-down slope power control is implemented through the digital multiplier of the power control module 307. Because the problem of non-linearity does not exist in the digital multiplier, not only the accuracy of control can be increased significantly, but also the linearity requirement of broadband transmitting channel can be decreased by performing pre-distortion processing for the up-down slope curves in advance. The front end of the multi-carrier broadband transmitter has excellent linearity characteristic, and the difference of the linearity between different transmitters is not large, so different base stations can also employ the same up-down slope power control curves. Dedicated high speed digital multiplier chip or FPGA can be used to form the digital multiplier of the power control module 307 for high speed signal processing. The static power control is performed by the voltage controlled attenuator 311 in the radio frequency domain, both the control precision and the control consistency can be ensured. Furthermore, the static power control and the up-down slope control are implemented separately in FIG. 3, so that only one up-down slope power control curve is required to be stored.

Under a normal operation state, the power control module 307 receives the carrier frequency number and the corresponding dynamic power level data. Then the dynamic power level data are transferred to the corresponding DUC 304, 305, 306 in which the power level is switched inside. The output results of multi-way DUC 304, 305, 306 are summed in the adder 310, and then transferred to the power control module 307. The power control data and the summation of multi-way DUC 304, 305, 306 are transferred together to the digital multiplier of the power control module 307, and the calculation result is the power controlled data, and it is then transferred to the digital to analog converter 308.

Figure 4:
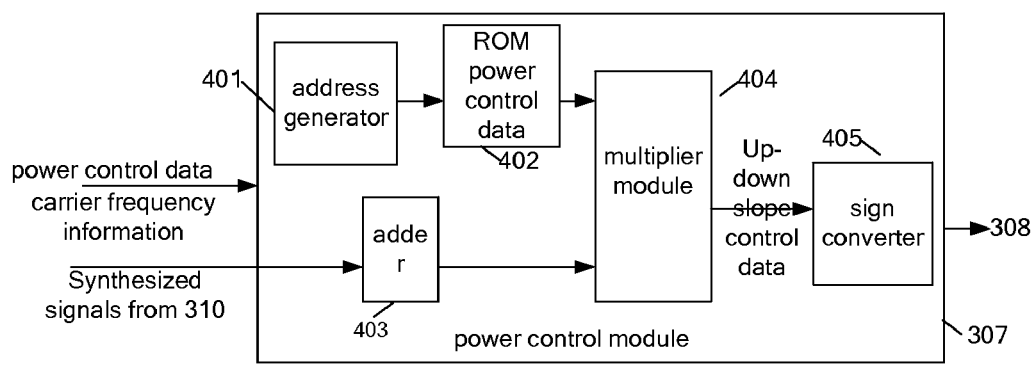
FIG. 4 is a structure schematic diagram of the power control module in FIG. 3.

Referring to FIG. 4, the power control module according to the present embodiment mainly comprises five modules: an address generator module 401, an adder module 403, a ROM power control data module 402, a multiplier module 404 and a sign converting module 405. The address generator module 401 is used to generate the read addresses for internal ROM power control data 402, generate corresponding addresses based on a time slot clock, a main clock and the determined power control bit location, and determine the time sequence of starting control, performing up slope or down slope and keeping the states. The summing of the output data of multi-way DUCs is completed by the adder module 403. The data are outputted from ROM power control data module 402 based on the addresses given by the address generator module 401 and the slope control signal. The multiplication of the power control data and the DUC data is performed by the multiplier module 404. The multiplication result is converted by the sign converting module 405 to a format required by DAC 308.

A multi-carrier power control method according to the invention comprises the steps as follows.

(1) The data processor receives the power data and the information of the respective carrier frequencies, and generates dynamic control data, up-down slope control data and the corresponding static control data for the respective carrier frequencies; the method for generating the up-down slope control data comprises: determining firstly a power control slope curve, then storing the curve data of that power control slope curve which can be called when required into the data processor; the up-down slope control data can be obtained in the analog domain; and different power levels have the same slope control curve and the same slope dynamic range.

(2) The data processor transfers the generated dynamic control data and static control data of the respective carrier frequencies to the corresponding digital frequency converters and voltage controlled attenuator, and the dynamic power level control is implemented by the digital frequency converters; and a simple transition control is performed for the dynamic power level control in the digital domain.

(3) The multi-way synthesized multi-carrier signal is obtained by summing up the output signals from the digital frequency converter in the summing module, and then the multi-carrier signal is transferred to the adder.

(4) The adder transfers the dynamic power level controlled multi-carrier signal to the digital to analog converter and the filter, and the signal is transferred to the voltage controlled attenuator after being digital to analog converted and filtered.

(5) The voltage controlled attenuator implements power slope control and static power control for the received multi-carrier signal in the radio frequency domain based on the up-down slope control data and the static power control data. The static power level control can be implemented together with the dynamic power level control, or be implemented together with the up-down slope curve control, or be singly implemented by the voltage controlled attenuator.

The method for implementing the static power level control together with the dynamic power level control comprises: the data processor sending both the static power level data and the dynamic power control data to the respective digital upconverters to realize power level control, implementing the static power control through the voltage controlled attenuator based on the up-down slop control.

The method for implementing the static power level control together with the up-down slope curve control comprises: the data processor transferring the static power level data and the up-down control data to the voltage controlled attenuator to realize static power level control and up-down control.

The method for implementing the static power level control singly through the voltage controlled attenuator comprises: the data processor transferring the static power level data to the voltage controlled attenuator to realize the static power level control.

The control method according to the invention has the following features.

1. The static power level control can be implemented not only together with the dynamic power level control or the up-down slope control in the digital domain, but also in the radio frequency domain by the voltage controlled attenuator.

2. The power control for the respective carriers is independent of each other, so that the transmitting power of any carrier at any time slot can be varied flexibly and easily.

3. The direct transition of the power control levels for the respective carriers is implemented only in the protection bit time period before multi-way synthesizing.

4. One curve is used to control the up-down slope. Therefore, different power levels have the same slope control curves and the same slope dynamic range, the consistency of the power control is improved significantly, and the difficulty of testing and manufacturing caused by that different power levels require different power curves can be avoided.

5. The up-down slope power control is implemented by the digital multiplier. Because the problem of non-linearity does not exist in the digital multiplier, the control precision of the power level is rather high, and the linearity requirement of the broadband transmitting channel can be decreased by performing pre-distortion processing for the up-down slope curves in advance.

The storing capacity of the power control data is rather small, and the data storing can be implemented by using FPGA.

INDUSTRY APPLICABILITY

The present invention employs the above-mentioned technical scheme in which the multi-carrier open-loop power control is used. In this technical scheme, the method of realizing the multi-carrier power control after synthesizing multi-way digital intermediate frequencies utilizes an inherent characteristic that the up-down slope control (including the static power control)of the respective carrier frequencies is performed synchronously. Moreover, the dynamic power level control and the up-down slope control are implemented separately to allow the power control for the respective carriers to be completely independent of each other. In this way, the transmitting power of any carrier at any time slot can be varied flexibly and easily. The advantages of the invention are as follows.

1. The power control for a plurality of carriers can be implemented simultaneously to satisfy the time domain template requirement and the frequency domain template requirement specified by GSM protocol.

2. The power control for the respective carriers is independent of each other, so the transmitting power of any carrier at any time slot can be varied flexibly and easily.

3. One up-down slope curve is shared by the respective carriers at different power levels, and the control thereof can be implemented in the digital domain or the analog domain.

4. The direct transition of the power control levels for the respective carriers is implemented only in the protection bit time period before multi-way synthesizing.

5. The static power level control can be implemented together with the dynamic power level control or the up-down slope control in the digital domain, and it can be implemented in the radio frequency domain by the voltage controlled attenuator also.

The invention claimed is:

1. A multi-carrier power control apparatus for base station in a broadband digital mobile communication system, comprising:
   N digital up-conversion processors, wherein N is an integer;
   a summing module;
   a data processor;
   a digital to analog converter;

a filter and a transmitter with a voltage controlled attenuator, and wherein the data processor is a power control module, N-way baseband signals are respectively inputted to the corresponding N digital up-conversion processors, and then outputted from N digital up-conversion processors to the summing module, synthesized signals outputted from the summing module are sent to the power control module to be processed, and meanwhile, power control data and carrier frequency information are sent to the power control module to be processed, and after being processed by the power control module, signals are outputted from the power control module through first, second, and third group of signals after being processed by the power control module, the signals of the first group being respectively sent to the N digital up-conversion processors, the signals of the second group being sent to the digital to analog converter, the filter, the transmitter with the voltage controlled attenuator consecutively, the signals of the third group being up-down slope control data and sent to the transmitter with the voltage controlled attenuator to be transmitted by the transmitter.

2. The apparatus of claim 1, wherein the power control module comprises an address generator, a power control data memory, an adder, a multiplier and a sign converter; address codes generated by the address generator are outputted to the power control data memory, and then outputted from the power control data memory to the multiplier; meanwhile, signals outputted from the adder are also outputted to the multiplier; after being accumulated by the multiplier, signals generated from the multiplier are outputted to the digital to analog converter through the sign converter.

3. A method of multi-carrier power control, employing an open-loop control method and implementing the power control for each carrier through a voltage controlled attenuator after multi-way synthesizing, said method comprising the steps of:

receiving, by a data processor, power control data and information of respective carrier frequencies, and generating dynamic power control data, up-down slope control data and corresponding static power control data corresponding to the respective carrier frequencies;

sending, by the data processor, the generated dynamic power control data and the static power control data corresponding to the respective carrier frequencies to corresponding digital up-conversion processors and the voltage controlled attenuator, and implementing, by the digital up-conversion processors, a dynamic power level control;

generating, by a summing module, a multi-way synthesized multi-carrier signal through summing up the signals outputted from the digital up-conversion processors, and sending the multi-carrier signal to an adder;

sending, by the adder, the dynamic power level controlled multi-carrier signal to the voltage controlled attenuator after digital to analog converting in a digital to analog converter and filtering in a filter; and implementing, by the voltage controlled attenuator, up-down slope control and a static power control for the received multi-carrier signal in a radio frequency domain based on the up-down slope control data and the static power control data.

4. The method of claim 3, wherein the up-down slope control data are obtained in an analog domain.

5. The method of claim 4, wherein the generating the up-down slope control data comprises: determining firstly a power control slope curve, and then storing curve data of the power control slope curve into the data processor to be called when required.

6. The method of claim 3, wherein the dynamic power level control is a simple transition control performed in a digital domain.

7. The method of claim 3, wherein the static power level control is implemented together with the dynamic power level control, or implemented together with the up-down slope control, or singly implemented by the voltage controlled attenuator.

8. The method of claim 7, wherein the static power level control is implemented together with the dynamic power level control is: the static power level data and the dynamic power control data are directly transferred together from the data processor to the respective digital up-converters to implement the power level control, and the static power control is implemented by the voltage controlled attenuator base on the up-down slope control.

9. The method of claim 7, wherein the static power level control is implemented together with the up-down slope control is realized through transferring both the static power level data and the up-down slope control data from the data processor to the voltage controlled attenuator.

10. The method of claim 7, wherein the static power level control is singly implemented by the voltage controlled attenuator is realized through transferring the static power level data from the data processor to the voltage controlled attenuator.

11. The method of claim 3, wherein different power levels have the same slope control curves and the same slope dynamic range.

* * * * *

UNITED STATES PATENT AND TRADEMARK OFFICE
CERTIFICATE OF CORRECTION

PATENT NO. : 7,336,726 B2
APPLICATION NO. : 10/469192
DATED : February 26, 2008
INVENTOR(S) : Yuxin Shu et al.

Figure 1:
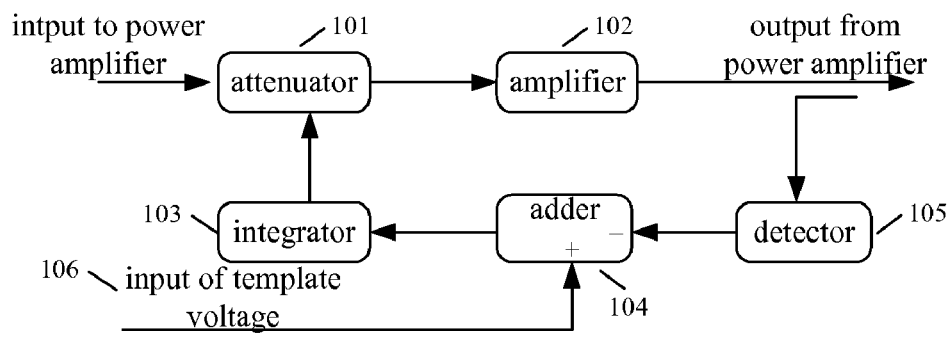
FIG. 1 is a principle block diagram for implementing the close-loop power control for base station in a single carrier GSM in prior art.

It is certified that error appears in the above-identified patent and that said Letters Patent is hereby corrected as shown below:

Sheet 1 of 2 Drawings-only black and white line drawings; Line 1 (Above Reference Numeral 103) (Fig. 1) Delete "intput" and insert -- input --, therefore.

Sheet 1 of 2 Drawings-only black and white line drawings; Line 1 (Above Reference Numeral 207) (Fig. 2) Delete "frenquency" and insert -- frequency --, therefore.

Column 2, Line 35 (Approx.) Delete "superlinearity," and insert -- super-linearity, --, therefore.

Column 2, Line 46-63, Below "invention." Delete "A multi-carrier power control.................to be transmitted by the transmitter.".

Column 3, Line 31, Below "converter." insert -- A multi-carrier power control method, employing an open-loop control method and implementing the power control for each carrier through a voltage controlled attenuator after multi-way synthesizing, comprising the steps of: --.

Column 7, Line 46, Delete "upconverters" and insert -- up-converters --, therefore.

UNITED STATES PATENT AND TRADEMARK OFFICE
CERTIFICATE OF CORRECTION

PATENT NO.       : 7,336,726 B2
APPLICATION NO.  : 10/469192
DATED            : February 26, 2008
INVENTOR(S)      : Yuxin Shu et al.

It is certified that error appears in the above-identified patent and that said Letters Patent is hereby corrected as shown below:

Column 9, Line 6, In Claim 1, after "from" insert -- the --.

Signed and Sealed this

Twenty-seventh Day of January, 2009

JOHN DOLL
*Acting Director of the United States Patent and Trademark Office*